Dec. 22, 1925.
O. PLETSCHER
1,566,693
MAGNETO ELECTRIC MACHINE
Filed April 11, 1922
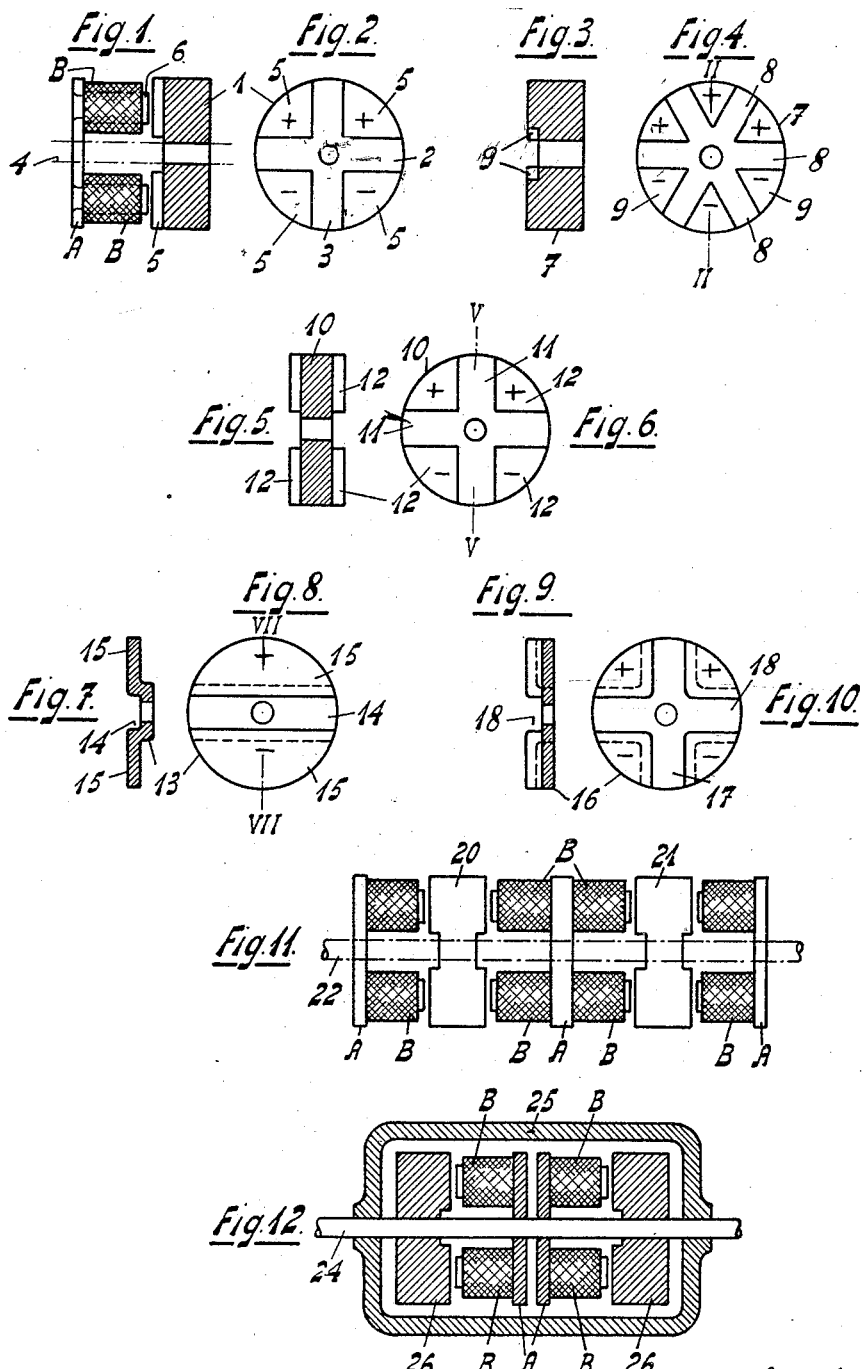

Patented Dec. 22, 1925.

1,566,693

UNITED STATES PATENT OFFICE.

OTTO PLETSCHER, OF ALBISRIEDEN, NEAR ZURICH, SWITZERLAND.

MAGNETO-ELECTRIC MACHINE.

Application filed April 11, 1922. Serial No. 551,685.

*To all whom it may concern:*

Be it known that I, OTTO PLETSCHER, a citizen of the Swiss Confederation, residing at Albisrieden, near Zurich, Canton Zurich, Switzerland, have invented new and useful Improvements in a Magneto-Electric Machine, of which the following is a specification.

The present invention relates to a new and improved magneto-electric machine comprising a permanent iron magnet and an armature.

The object of the invention is to provide a simple generator, which may be made at little expense and which needs but little space.

I obtain these and other objects by giving the permanent magnet the shape of a disk having on one or both sides grooves by means of which a desired number of poles are formed.

In the accompanying drawings several modes of construction are shown by way of examples.

Fig. 1 shows in a diagrammatic manner in side elevation a permanent magnet and the armature.

Fig. 2 is a front view of the permanent magnet.

Fig. 3 is a detail section view of a modified form of the permanent magnet.

Fig. 4 is an elevated view of the same.

Fig. 5 is a section view of another modified form of the permanent magnet.

Fig. 6 is an elevation of the same.

Fig. 7 is a section view of another form of the permanent magnet.

Fig. 8 is a front elevation of the same.

Fig. 9 is another form of the same.

Fig. 10 is a plan of the form shown in Fig. 9.

Fig. 11 is an elevation showing an arrangement of the permanent magnet and armatures in accordance with this invention.

Fig. 12 is a section view showing a modified arrangement of the same.

The permanent iron magnet has the shape of a circular disk 1 and is provided with two grooves 2, 3 standing at right angle to each other and intersecting the axis of the disk 1. Said disk 1 is mounted on a shaft 4 on which a second disk A is mounted. On the disk A coils B of insulated wire are fixed, said coils being arranged on cores 6 and connected to a commutator which may be of any well known construction and which therefore is not shown in the drawing. The faces of the cores end at a small distance from the polar projections 5 of the permanent magnet formed by the grooves 2, 3. The faces of the cores 6 and the faces of the polar projections 5 are in planes parallel to each other, said planes standing at a right angle to the axis of rotation. The disk A is made of annealed iron. On rotation of the shaft 4 electric current is generated in the well known manner. The permanent magnet takes very little space and is very efficient.

In Figs. 3 and 4 another shape of the permanent magnet is shown, Fig. 3 being a section on line II—II of Fig. 4. The disk 7 is provided with three grooves 8 intersecting the axis of the disk 7, there being six polar projections 9 formed thereby. The disk 7 is used in combination with the armature A shown in Fig. 1.

Figs. 5 and 6 show a modified construction of the permanent magnet, Fig. 5 being a section on line V—V of Fig. 6 and Fig. 6 a face view thereof. The circular disk 10 is provided on both its faces with grooves 11 standing at right angles to each other. Four polar projections 12 are formed thereby on each face of the disk 10.

The permanent magnet may be stamped of sheet iron as shown in Figs. 7 and 8; Fig. 7 being a section on line VII—VII of Fig. 8 and Fig. 8 a face view of the permanent magnet. The latter consists of a circular disk 13 provided with but one groove 14 intersecting the axis whereby two equal polar projections 15 are formed.

Figs. 9 and 10 show in section and in a face view a disk 16 of stamped sheet iron, two grooves 17, 18 being provided running at right angles to each other and intersecting the axis.

The permanent magnet and the armature may be arranged as shown in Figs. 11 and 12. In the arrangement shown in Fig. 11 two permanent magnets 20, 21 are arranged on a common shaft 22, the magnets having the shape as described with reference to Figs. 5 and 6. On both sides of the permanent magnets 20, 21 disks A with coils or bobbins B are arranged on the shaft 22.

In the construction shown in Fig. 12 a shaft 24 is journalled in a casing 25 and on the shaft 24 two permanent magnets 26 of the type shown in Figs. 1 and 2 are mounted. Adjacent to the polar projections thereof two disks A with coils B are arranged.

Either the disks A with the coils B or the permanent magnets may be made to rotate and either the magnets or the disks A may be made stationary.

Any suitable well known means may be employed to produce the necessary relative rotation between the electromagnet and the permanent magnet. My construction of the permanent magnet has the advantage that it secures less resistance of the air against rotation of the disk and provides a larger mass to be rotated. These two factors—decrease of air resistance and increase of rotary mass—play an important part in those dynamos which are reduced to a very small volume because they facilitate the operation of such small machines.

The parallel grooves passing through the center of the disk and subdividing the recess thereof leave a larger part of the disk intact and the entire mass is therefore not greatly interfered with by the provision of these parts.

To obtain the best effect it is essential that the length or thickness of the disk is less than its diameter.

The invention is especially useful in the construction of electric cycle lamps, hand operated portable lamps, toys etc. where little space is available.

What I wish to secure by U. S. Patent is:

In a magneto electric machine, an electro-magnet and a permanent magnet arranged in confronting relation and for relative rotation, said permanent magnet being a circular disc and being provided, on the side opposed to the pole pieces of the electro-magnet with a groove extending centrally thereacross at right angles to the axis of rotation and thereby forming polar projections of relatively large superficial area.

In witness whereof I affix my signature.

OTTO PLETSCHER.